Figure 1:
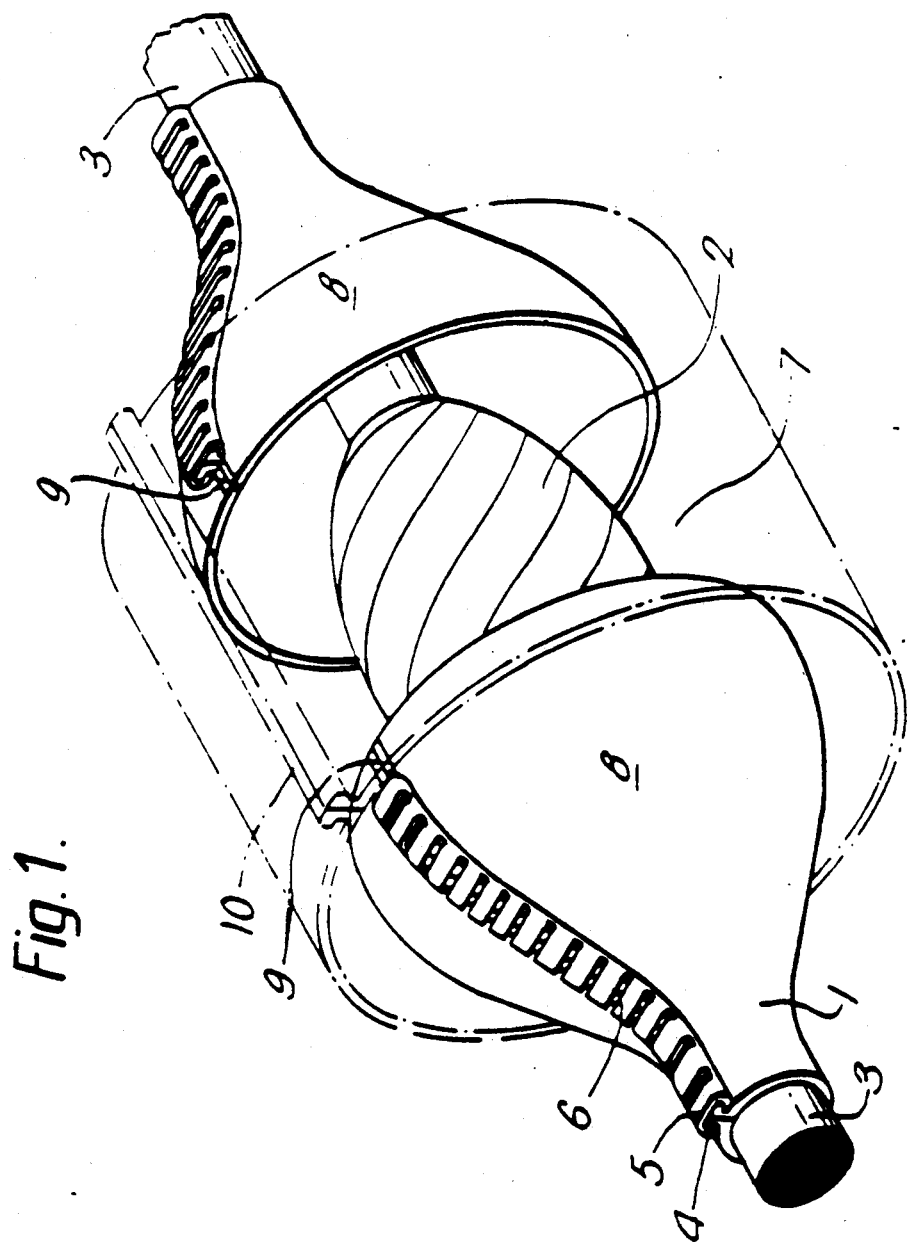

United States Patent [19]

Read et al.

[11] Patent Number: 5,215,607
[45] Date of Patent: Jun. 1, 1993

[54] RE-ENTRY AND RECLOSURE OF CABLE SPLICE CASE

[75] Inventors: Michael R. Read, Los Altos, Calif.; Henri Verhoeven, Kessel, Belgium

[73] Assignee: N.V. Raychem S.A., Kessel, Belgium

[21] Appl. No.: 655,406

[22] PCT Filed: Aug. 15, 1989

[86] PCT No.: PCT/GB89/00949
 § 371 Date: Apr. 15, 1991
 § 103(e) Date: Apr. 15, 1991

[87] PCT Pub. No.: WO90/01822
 PCT Pub. Date: Feb. 22, 1990

[30] Foreign Application Priority Data

Aug. 15, 1988 [GB] United Kingdom ............... 8819354

[51] Int. Cl.⁵ ............................................. H01B 13/00
[52] U.S. Cl. .......................................... 156/56; 156/49;
 156/86; 156/248; 29/868; 174/92; 174/DIG. 8;
 428/35.1
[58] Field of Search ................. 174/92, DIG. 8, 21 R;
 428/34.9, 35.1; 156/49, 56, 86, 248; 29/868, 871

[56] References Cited

U.S. PATENT DOCUMENTS

| | | | |
|---|---|---|---|
| 4,436,566 | 3/1984 | Tight, Jr. ........................ | 174/92 X |
| 4,468,536 | 8/1984 | Van Noten ..................... | 174/92 |
| 4,498,938 | 2/1985 | Moisson et al. ............ | 174/DIG. 8 X |
| 4,693,767 | 9/1987 | Granna et al. ................... | 156/49 |
| 4,711,975 | 12/1987 | Morel et al. ................... | 156/49 X |
| 4,766,267 | 8/1988 | Gray et al. .................. | 174/DIG. 8 |
| 4,767,652 | 8/1988 | Willie et al. ...................... | 174/92 X |
| 4,885,194 | 12/1989 | Tight, Jr. et al. ............... | 428/34.9 |

FOREIGN PATENT DOCUMENTS

| | | |
|---|---|---|
| 0068705 | 1/1983 | European Pat. Off. . |
| 0092347 | 10/1983 | European Pat. Off. . |
| 0116393B | 8/1984 | European Pat. Off. . |
| 0188777 | 7/1986 | European Pat. Off. . |
| WO90/01822 | 2/1990 | PCT Int'l Appl. ................ 174/92 |
| 1155470 | 6/1969 | United Kingdom . |
| 2133639 | 7/1984 | United Kingdom .............. 428/35.1 |
| 2144592 | 3/1985 | United Kingdom . |
| 2195840A | 4/1988 | United Kingdom . |

Primary Examiner—David A. Simmons
Assistant Examiner—Mark A. Osele
Attorney, Agent, or Firm—A. Stephen Zavell; Herbert G. Burkard

[57] ABSTRACT

The present invention provides a method of re-entering and reclosing a cable splice case enclosing a splice between first and second cables and comprising a wrap-around sleeve and a closure channel, the sleeve having opposing longitudinal edge portions, each bearing a rail, the edge portions having been brought together around the splice such that the rails are adjacent one another and the closure channel being positioned over the adjacent rails, which method comprises:

(a) removing a portion of the sleeve from the splice, leaving an end portion of the sleeve attached to the first cable;
(b) removing a portion of the channel from the rails of the remaining portion;
(c) positioning over the rails of the end portion at a position where the portion of channel has been removed a hot-melt adhesive plug, the plug having a recess for receipt of the rails;
(d) positioning a heat-shrinkable reclosure sleeve around the splice, the reclosure sleeve extending from the adhesive plug at the end portion; and
(e) heating to cause the reclosure sleeve to shrink into engagement with the end portion and to cause the plug to soften and form a seal.

2 Claims, 5 Drawing Sheets

RE-ENTRY AND RECLOSURE OF CABLE SPLICE CASE

This invention relates to a technique for re-entry and reclosure of a cable splice case, particularly formed from a heat-shrinkable wrap-around sleeve Where cables, such as multicore telecommunications cables are spliced a protective covering known as a splice case, has to be built up around the splice and extending from the intact cable jacket on one side of the splice to the intact cable jacket on the other side of the splice. In this way the missing cable jacket is replaced, providing environmental protection for the otherwise exposed conductors, and the resulting splice case is generally expected to have a life-time comparable to that of the cables themselves, typically at least twenty years.

In recent years, heat-shrinkable plastics materials have been used in the form of sleeves that are positioned around cable splices and shrunk down into engagement with the cables to either side of the splice. Heat-shrinkability allows such sleeves to be supplied over-sized, providing easy installation, and afterwards caused to engage tightly against the cables, providing excellent environmental sealing, by the simple step of heating, generally by means of a gas torch.

In order to provide improved mechanical strength, and often to provide an enhanced barrier to transmission of water vapour, such sleeves may be used with a liner. A liner comprises a central cylindrical part and frusto-conical end pieces and is positioned around a cable splice, the central part overlying the bulky splice itself and the end pieces providing smooth tapers down to the cables to either side of the splice. A liner may comprise, for example two semi-cylindrical half shells or a sheet of material that is rolled around the splice. In either case, end portions of the liner may comprise tapered fingers (giving ends of the liner the appearance of a crown) which can be bent inwards to provide the frusto-conical end portions. The sleeve is shrunk around the liner, giving the resulting splice case the shape of a cylinder with frusto-conical ends.

It is often desirable that the sleeve be installable around a cable splice without access to a free cable end, in which case a sleeve supplied in tubular form (of closed cross-section) cannot of course be used. The solution is to use a wrap-around sleeve, a most successful design of which is disclosed in GB 1155470 (Raychem). Such a sleeve is supplied as a sheet of heat-shrinkable material having upstanding protuberances (known as rails, although no particular shape is implied by the term) at, and generally running continuously along, opposing edge portions of the sheet. The sleeve is wrapped around the splice by bringing together opposing rails which are then secured together to maintain the sleeve in the wrapped-around configuration. They may be secured together by, for example, an elongate channel C-shaped in cross-section that is slid over them. The sleeve is then heated to cause it to shrink. One of the rails may be positioned a short distance (a few centimeters being typical) from an extreme edge, the portion of sleeve between that rail and that extreme edge being known as a flap. The flap will underlie the two rails when they are brought together on installation of the sleeve, and may form a seal or help improve sealing between the rails.

The sleeve may be internally coated with a sealing material to enhance the environmental seal provided. Preferably the sealing material is heat-activatable, for example a hot-melt adhesive, such that a single heating step causes shrinkage of the sleeve and activation of the sealing material.

It may be necessary to re-enter a splice case in order to gain access to the conductors within. This may be necessary in order to repair a fault, to reorganize the spliced conductors or to make new connections. After the splice has been attended to a new splice case has to be built. A special technique of re-entry and reclosure has been developed for splice cases formed from heat-shrinkable sleeves and the present invention is a modification of that technique.

The known technique is as follows. Firstly, the rails and channel are cut away from the surface of the sleeve. This need not cause the sleeve to open up since an underlying adhesive may secure the sleeve together during its service life; the rails and channel serving to hold the sleeve closed merely during heat installation. A circumferential cut is made through the splice case approximately at each end of the cylindrical portion thereof.

A longitudinal cut is then made joining the two circumferential cuts, and the portion of sleeve between those two cuts is removed by unwrapping it away from the underlying liner. This leaves frusto-conical butts of the old sleeve in place on the cables, from between and within which the liner can be pulled away exposing the splice. In some designs of splice case the liner may come away with the central part of the sleeve. The sleeve is preferably not removed in its entirety because the seals between the sleeve and the cables once made are best not disturbed.

After attention to the splice the liner is replaced (or if it was damaged a new liner inserted) and a new sleeve, which may be shorter than the original sleeve, is shrunk over the butts of the old sleeve so that it bridges the gap between them. If this new sleeve is to make an environmental seal to the butts of the old sleeve it was thought necessary that the circumference of the butts be smooth at some position along their length over which the new sleeve will lie; hence removal of the old rails and channel.

In spite of removal of the old rails and channel, a smooth circumference could not always be obtained, and much effort has been expended in overcoming the following problems.

The channel is not able to hold the rails together in such a way that there is no gap between them at their base. This is because the channel must be a reasonably easy fit over the rails if friction is not to prevent it being installed, and because the shrinkage forces of the sleeve tend to pull the base of the rails apart from one another. When the rails and channel are cut from the sleeve a groove will therefore be visible between the resulting edges of the sleeve, which will provide a leak path into the reclosed splice case formed by shrinking down the new sleeve. Various techniques have been proposed to fill such a groove with adhesive. EP 0068705 (Raychem) discloses a shrinkable sleeve of the rail-and-channel type with flap, having at the base of one of the rails (or the flap) means which on recovery of the sleeve allows passage of sealant on a surface of the sleeve into a region between the two rails and the flap. EP 0092347 (Raychem) discloses a rail-and-channel type of sleeve having means that provides localized separation between the rails when they are held together by the channel, resulting in localized adhesive bonding of the rails.

Contrary to the teaching of the prior art, we have now found that a good reclosure seal can be achieved even if the rails are not totally removed. It may be advantageous to retain the rails where the material of the sleeve is difficult to cut or where damage or dislocation of a flap is a risk.

A heat-shrinkable sleeve that is difficult to cut, and that therefore has excellent split resistance, is disclosed in EP0116393 (Raychem). That sleeve comprises a composite structure of a heat-recoverable fabric and a polymer matrix material (to which fibres of the fabric are preferably bonded), wherein:

(a) the heat-recoverable fabric comprises fibres (preferably cross-linked) that will recover when heated, the fibres having a recovery stress (Y) of at least $5 \times 10^{-2}$ MPa at a temperature above their recovery temperature (preferably crystalline melting transition temperature); and (b) the polymer matrix material (preferably cross-linked) has an elongation/temperature profile such that there exists a temperature (T) which is at or above the recovery temperature of the fibres, at which temperature the polymer matrix material has an elongation to break of greater than 20% and a 20% seacant modulus (X) of at least $10^{-2}$ MPa (measured at a strain rate of 300% per minute), and at which temperature the inequality (1) is satisfied.

$$\frac{X}{Y} \cdot \frac{(1-R)}{R} \text{ is less than one} \quad (1)$$

where R is the mean effective volume fraction of heat recoverable fibres in the composite structure along a given direction based on the total volume of the composite structure, or relevant portion thereof.

Such a composite structure preferably comprises a weave or knit of recoverable cross-linked polyolefin (preferably high density polyethylene) together with a non-recoverable fibre such as glass, embedded in a preferably cross-linked polymeric matrix material, for example low density polyethylene.

The present invention allows reclosure over existing rails by providing a plug comprising a sealing material that can be positioned over the rails, and that is heat-softenable.

Thus, the present invention provides a method of reentering and reclosing a cable splice case enclosing a splice between first and second cables and comprising a wrap-around sleeve having opposing longitudinal edge portions, each bearing a rail, the edge portions having been brought together around the splice such that the rails are adjacent one another and having a closure channel over the adjacent rails, which method comprises:

(a) removing a portion (preferably an intermediate portion) of the sleeve from the splice, leaving an end portion of the sleeve attached to the first cable (preferably to each of the first and second cables);

(b) removing a portion of the channel from the rails of the (preferably each) remaining end portion;

(c) positioning over the rails of the (preferably each) end portion at a position where the portion of channel has been removed a hot-melt adhesive plug, the (preferably each) plug having a recess for receipt of the rails;

(d) positioning a heat-shrinkable reclosure sleeve around the splice, the reclosure sleeve extending from the adhesive plug at the end portion (preferably to the adhesive plug at the other end portion); and (e) heating to cause the reclosure sleeve to shrink into engagement with the end portion (preferably portions) and to cause the plug to soften and form a seal.

A surprisingly good environmental seal can be made in this way. We have found that it is desirable to remove portons of the channel in order to reduce the chance of a leak path existing along the channel due to its possibly complex shape preventing full flowing of the adhesive of the plug. Also, the channel may comprise metal and be susceptible to corrosion, and removal of a portion of it will break any leak or corrosion path. Preferably the portion of channel that is removed is a portion at the new end that is created by removal of the intermediate portion of the sleeve.

The channel is preferably elongate and substantially C-shaped in cross-section and the rails preferably have an undercut adjacent the surface of the sleeve. Then, the channel can be slid longitudinally over the rails, but cannot be removed from them in a direction radial with respect to the sleeve. It may be desirable that the channel be flexible (after shrinkage the sleeve will generally adopt the shape of the splice) and to this end it may have transverse slots spaced longitudinally along its back-bone. Thus, its edges that grip the sleeve at the undercut of the rails may be continuous which may aid installation of the channel and avoid damage to the sleeve.

The channel may comprise two or more (preferably three) parts, the parts optionally being temporarily held together or held aligned by clips.

The adhesive plug referred to above preferably comprises a hot-melt adhesive, especially one based on a polyamide. It preferably has a crystalline melt temperature from 50° C. below to 15° C. above the recovery temperature of the reclosure sleeve. A more preferred range is from 40° C. below to 10° C. above, especially from 40° C. below to 5° C. above. The melt temperature is preferably from 70° C. to 130° C., more preferably 80° C. to 120° C. Its viscosity at about 160° C. is preferably from 20-100 pascal seconds, more preferably from 35-70 pascal seconds.

The plug is preferably shaped to have a flat or gently curved upper surface (the surface that will face the overlying reclosure sleeve) and a lower surface shaped to receive the rails. The lower surface therefore preferably has a recess therein, which recess is preferably blind so that a block of adhesive is provided adjacent the newly cut ends of the rails. The plug is preferably a close fit over the rails so that friction can hold it in place during the reclosure operation.

When the plug is softened on heating it may be forced out from under the reclosure sleeve and observed, thus indicating that sufficient heat has been applied to the plug. The reclosure sleeve may, however, be internally coated with a sealing material such as a hot-melt adhesive and this too may be forced out on heating (due to the recovery forces of the sleeve) and as a result it may be difficult to be certain that the plug has properly softened. Extra heat may be needed to soften the plug, due to the greater thermal mass of the plug and due to its being shielded by the overlying sleeve. In order that softening of the plug be separately visible it is preferred that the plug and the sleeve adhesive be of different colours. The plug is preferably of a bright colour such as orange or yellow.

In addition to the sleeves, the splice is preferably further protected by a liner, over which the original sleeve and later the reclosure sleeve are installed. The liner may comprise a sheet of material such as cardboard, optionally with other layers such as metal foil or plastics film, that is rolled around the splice and has tapered ends. Alternatively it may comprise metal half-shells with integral or separate tapering ends.

The original sleeve is preferably installed around the sleeve by heat-shrinkage, although non-heat shrinkable sleeves may be used. Preferred sleeves are fabric-based composites as described above, preferably comprising a weave of circumferentially-extending recoverable fibres (preferably weft but optionally warp) and longitudinally-extending non recoverable fibres (preferably warp but optionally weft) such as glass. The longitudinally-extending fibres may comprise monofilaments or multi-filament bundles, such bundles preferably being blocked by a polymeric material to prevent fluid wicking along the interstices between the filaments. Such wicking could provide a leak path into the reentered and reclosed splice case.

Subsequent reentries and reclosures may be carried out by methods disclosed above (all or only an intermediate portion of the first reclosure sleeve being removed) but, for example, the whole of the rails and channel of the first reclosure sleeve may be removed. This modification may be preferred in order that the original adhesive plugs be not disturbed.

Figure 2A:
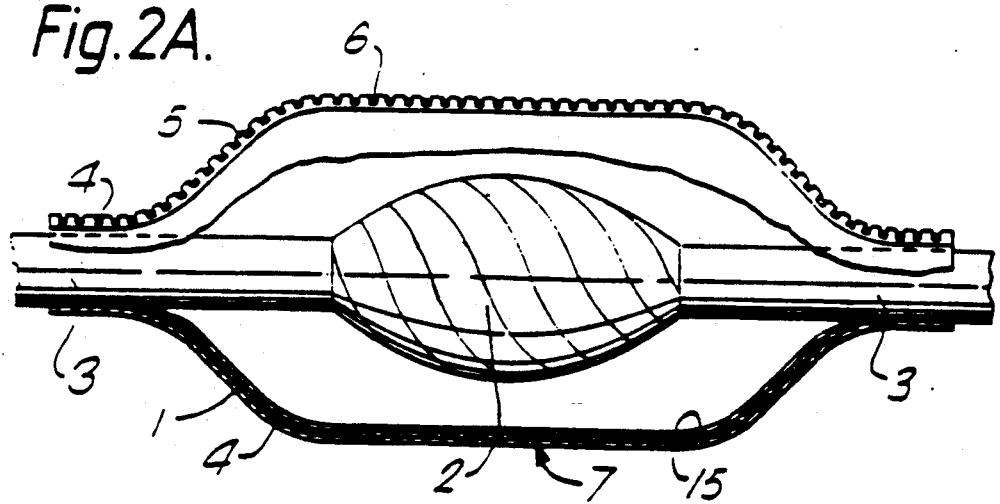
Figure 2B:
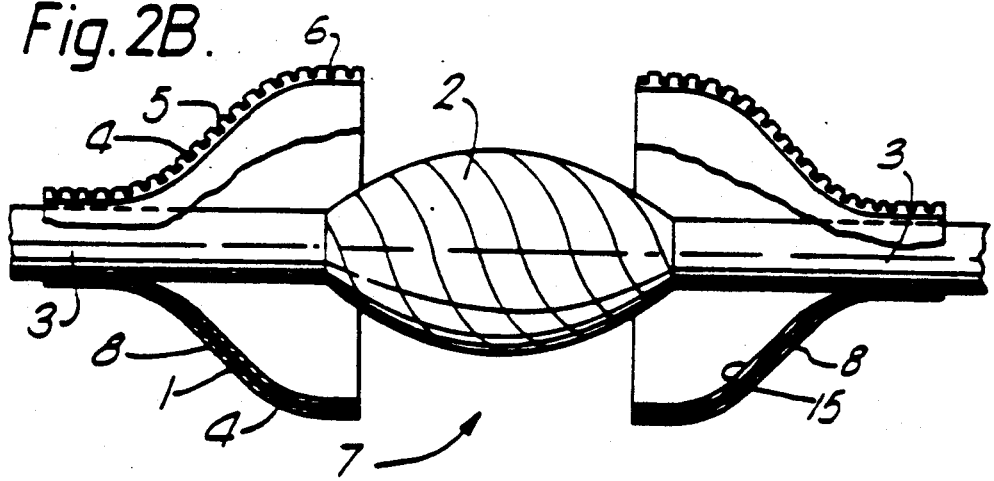
Figure 2C:
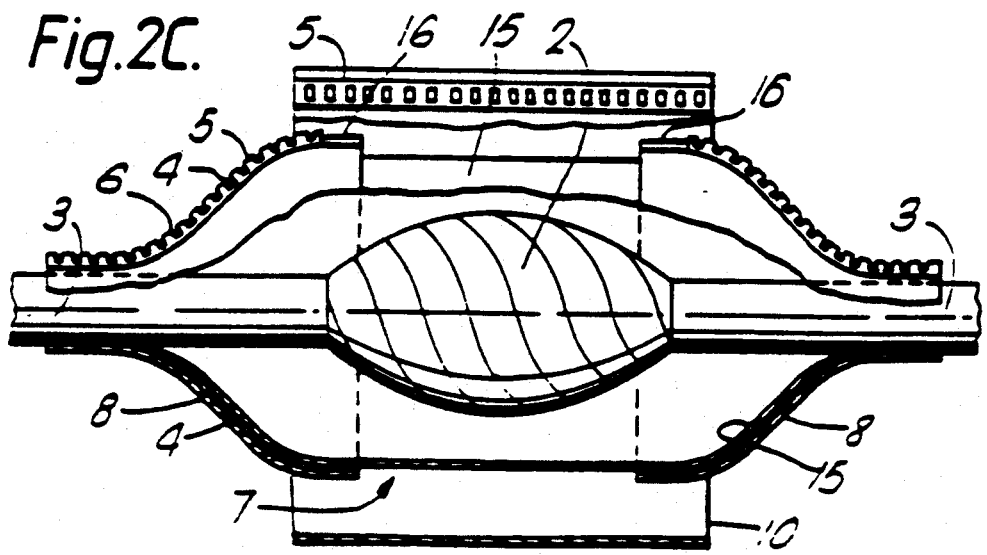
Figure 3:
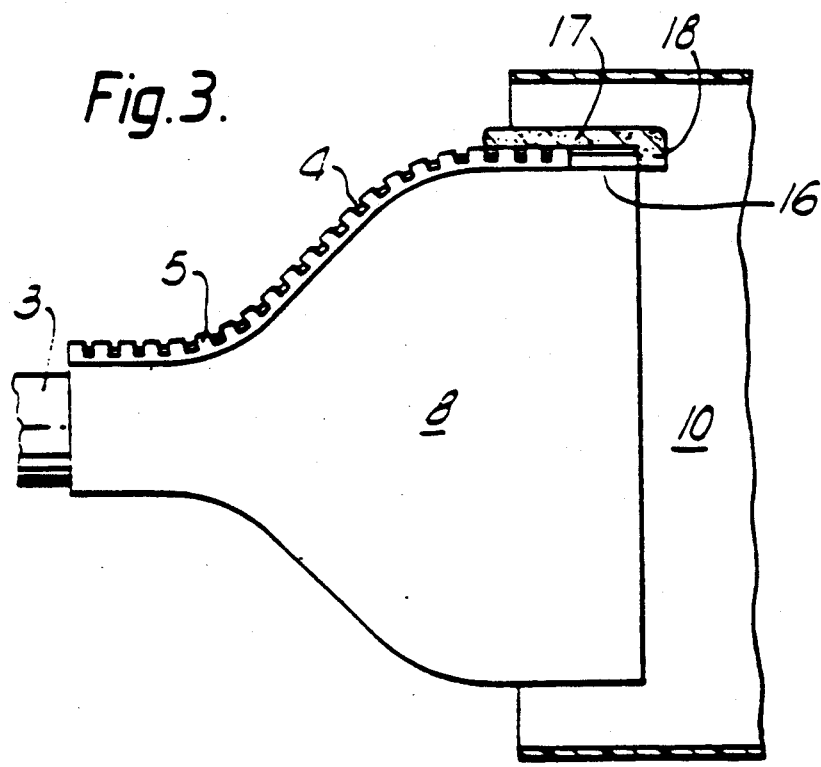
Figure 4A:
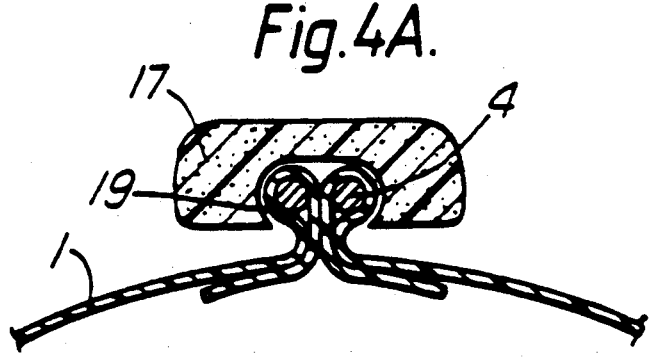
Figure 4B:
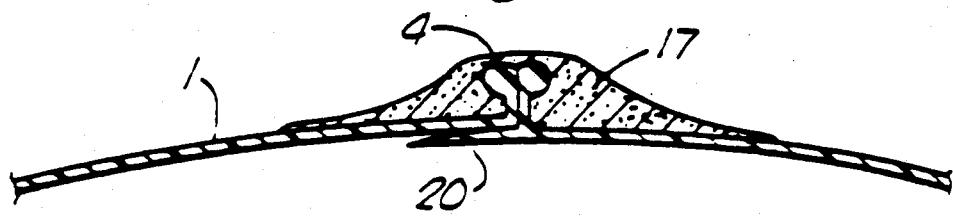

The present invention is further illustrated with reference to the accompanying drawings, in which:

FIG. 1 shows a prior art splice case after re-entry;

FIGS. 2a 2b 2c show various steps of the method of the invention;

FIGS. 3 and 4a and 4b show an adhesive plug as used in the present invention;

FIGS. 5 and 6a, 6b, and 6c show an alternative design of adhesive plug; and

Figure 6A:
Figure 6B:
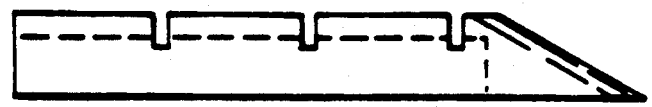
Figure 6C:
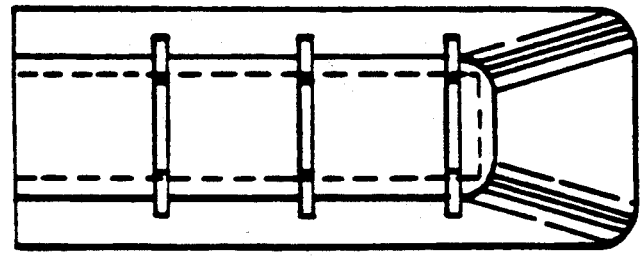

FIG. 6a, 6b, and 6c shows preferred dimensions in m.m, and these may be varied by plus or minus 20%.

FIG. 1 shows a splice case formed by shrinking a wraparound sleeve 1 around a cable splice bundle 2 and into engagement with two cables 3 that it joins. Opposing longitudinal edge portions of the wraparound sleeve 1 bear upstanding rails 4 which are trapped within a closure channel 5, substantially C-shaped in cross-section. The rails are undercut adjacent a surface of the sleeve thus preventing the channel from parting radially from the rails on recovery of the sleeve.

The channel 5 is provided with transverse slots 6 longitudinally spaced along its "backbone", that is along the left hand side of the letter C as written. These slots provide longitudinal flexibility, i.e. allow the channel to take up the shape of the splice as shown.

In this prior art technique, a greater length of rails and channel than of sleeve is removed in order to leave smooth areas 9 of sleeve free of upstanding rails. A new sleeve 10 can thus be shrunk over a surface of smooth, uninterupted, circumference.

A reentry and reclosure method according to the invention is shown in FIGS. 2a, 2b and 2c. In FIG. 2a an intact original sleeve 1 is shown around a splice 2 between cables 3. The sleeve 1 is installed around a liner 15 which gives the splice case extra strength, a pleasing shape, and may provide a moisture vapour barrier. The sleeve carries a hot-melt adhesive on its inner surface, which is shown dotted.

Re-entry is achieved by making two circumferential cuts and removing an intermediate portion 7 of the sleeve, as shown in FIG. 2b. If a multi-part liner is used, a central portion may come away with the central part of the sleeve; alternatively the entire liner may be pulled out from between and within the remaining end portions 8 of the sleeve.

A portion of channel 5 is removed from each end portion 8, preferably at the newly created ends, to leave exposed portions 16 of the rails, where the adhesive plugs are to be positioned. A reclosure sleeve 10 is shown positioned around the splice ready for shrinkage down to form a bridge for one end porton 8 to the other. The sleeve 10 can be seen to extend from one adhesive plug to the other, and may of course also extend past the plugs. The reclosure sleeve will generally be of the wraparound type, and a closure channel 6 is depicted. The liner 15 can be seen to have been reconstructed (or replaced).

FIGS. 3, 4a, 4b,5,6a,6b and 6c show an adhesive plug as used in the invention. In FIG. 4 an end portion of the channel 5 can be seen to be removed to leave a portion 16 of the rails 4 exposed. The adhesive plug 17 is shown in part in FIG. 3, and may have a central recess as shown in FIG. 4A into which the rails 4 are received. The plug 17 may have an end part 18 that does not have a recess. The recess is shown as 19 in FIG. 4a, and its internal dimensins preferably correspond to the external dimensions of the channel 5.

In FIG. 4a the rails 4 are formed by folding edge portions of the sleeve along elongate members, such as solid flexible rods for example nylon or glass multifilaments, and optionally causing heat-shrinkage of those edge portions.

FIG. 4b shows the adhesive plug 17 after it has been heat softened and deformed by an overlying shrinking sleeve (not shown) thereby forming a seal between that new sleeve and the original sleeve. In this embodiment, the rails are formed as integral protrusions from edge portions of the sleeve 1. One rail 4 is set back from the extreme edge of the sleeve to define a flap 20 that underlies the bases of the rails to help form a seal between them. The flap may however be separate from the sleeve. A similar flap or one bonded to the sleeve may be provided in the embodiment of FIG. 4a.

Figure 5:
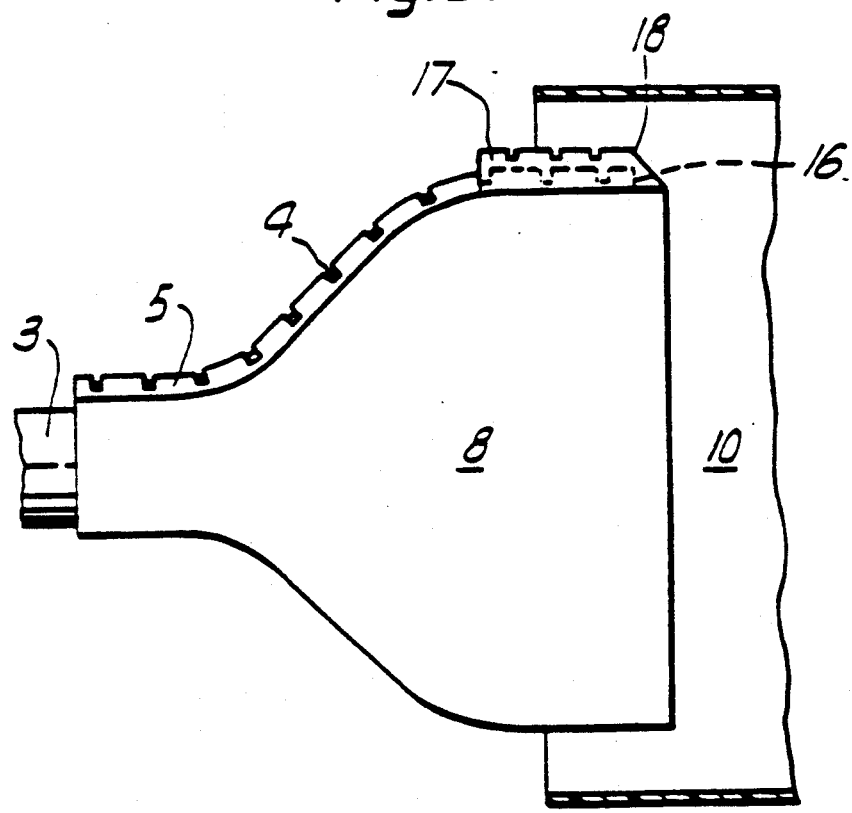

FIGS. 5 and 6 show an alternative design of adhesive plug. More specifically, FIG. 5 illustrates the article similar to FIG. 3 containing a cable 3, a channel 5, a rail 4, an end portion of the sleeve 8, a reclosure sleeve 10 and also alternative plug design 17. This alternative plug design 17 is more particularly illustrated with respect to its shape in FIGS. 6A, 6B and 6C. The tapered wedge shaped portion 18 of the plug disposes the sleeve 10 up and over the end portion 8 and the adhesive plug 17.

For the avoidance of doubt it is stated that the invention provides sealing, reentry and reclosure techniques and articles therefore (including a sleeve, a channel, and a sealing material) and that any of the techniques disclosed herein may be used singly or in any combination.

What is claimed is:

1. A method of reentering and reclosing a cable splice case enclosing a splice between first and second cables and comprising a wrap-around sleeve and a closure channel, the sleeve having opposing longitudinal edge portions, each bearing a rail, the edge portions having been brought together around the splice such that the rails are adjacent one another and the closure channel being positioned over the adjacent rails, which method comprises
  (a) removing a portion of the sleeve from the splice, leaving an end portion of the sleeve attached to the first cable;
  (b) removing a portion of the channel from the rails of the remaining end portion;
  (c) positioning over the rails of the end portion at a position where the portion of channel has been removed a hot-melt adhesive plug, the plug having a recess for receipt of the rails;
  (d) positioning a heat-shrinkable reclosure sleeve around the splice, the reclosure sleeve extending from the adhesive plug at the end portion; and
  (e) heating to cause the reclosure sleeve to shrink into engagement with the end portion and to cause the plug to soften and form a seal.

2. A method according to claim 1, in which the plug comprises an adhesive having a crystalline melting point of from 50° below to 10° C. above the recovery temperature of the sleeve.

* * * * *